Sept. 21, 1943.   B. C. W. HAGELIN   2,330,049
POSITIVE DETENT
Filed Jan. 27, 1943   2 Sheets-Sheet 1
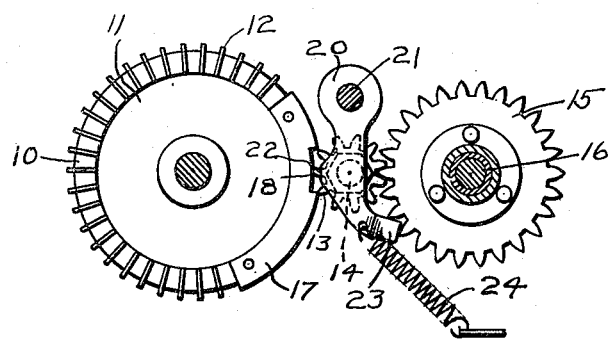
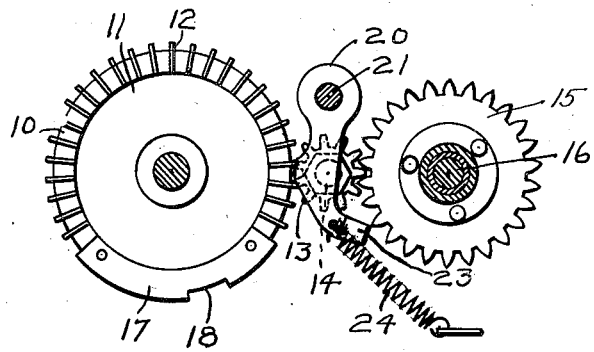
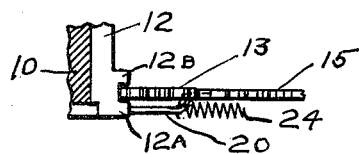
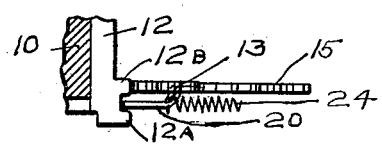
INVENTOR
BORIS C. W. HAGELIN
BY *Darby & Darby*
ATTORNEYS Sept. 21, 1943. B. C. W. HAGELIN 2,330,049
POSITIVE DETENT
Filed Jan. 27, 1943 2 Sheets-Sheet 2

INVENTOR
BORIS C. W. HAGELIN
BY Darby & Darby
ATTORNEYS

Patented Sept. 21, 1943

2,330,049

UNITED STATES PATENT OFFICE 2,330,049

POSITIVE DETENT

Boris Ceasar Wilhelm Hagelin, Greenwich, Conn.

Application January 27, 1943, Serial No. 473,680

5 Claims. (Cl. 192—4)

The present invention relates to a positive detent mechanism which may be utilized in any machine wherein a gear having a variable number of active teeth is utilized to drive a mating gear. While it is generally true that such drive mechanism is utilized in calculating machines and especially in those wherein the active teeth are interspersed with inactive teeth over the periphery of the gear, nevertheless, the detent mechanism is, as was stated above, usable in any instance in which the drive is by means of a gear having a variable number of teeth.

In such drives when the operating speed is moderate the inertia of the driven gear may be readily counteracted by means of spring or mass controlled detents thereby preventing overtravel and inaccuracy. As the operating speed is increased, however, practical difficulties arise inasmuch as detent loads must be increased in order to counteract the increased momentum of the actuated or driven gears. Such increasing of the spring or mass loading of the detents causes increased wear and may require increased operating power.

As has been indicated, positive locks have previously been utilized in the case where the active teeth of the driving gear follow one another in succession, as for example in calculating machines where customarily a number of teeth varying from one to ten may be in active position but these teeth always follow in succession, that is if one step of movement is to be imparted to the driven gear the tenth tooth is rendered active, if two steps are to be imparted thereto the ninth and tenth teeth, etc.

It is an object of this invention to provide a positive detent mechanism to be used in connection with a variable drive in which the variability depends upon the number of teeth of the gear active during any particular rotation thereof.

It is a further object of the invention to provide such a detent mechanism which shall be simple in construction and operation and which does not require heavy spring, mass or other loading to bring about the relative positiveness of its action.

Other objects and features of the invention will appear when the following specification is considered together with the appended drawings in which Figure 1 is a side view of the mechanism of my invention shown in its application to a ciphering machine, the parts being in their normal position in this figure.

Figure 2 is similar to Figure 1 but shows the parts after a partial rotation of the driven and intermediate idler gears.

Figure 3 is a fragmentary view showing a sliding gear tooth of Figure 2 in inactive position. The parts are in the relative positions of Figure 2.

Figure 4 is similar to Figure 3 but shows the gear tooth in active position, that is in position to drive the intermediate and driven gears.

Figure 5:
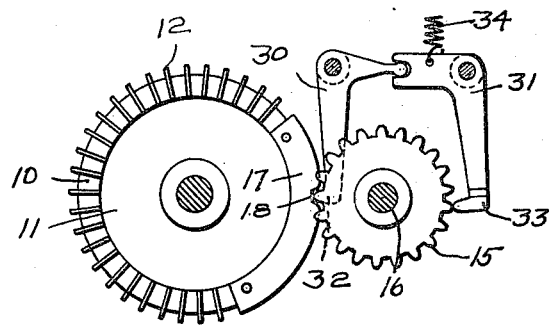
Figures 5, 6, 7 and 8 are respectively similar to Figures 1, 2, 3 and 4 but show a modified form of the detent mechanism of this invention.
Figure 6:
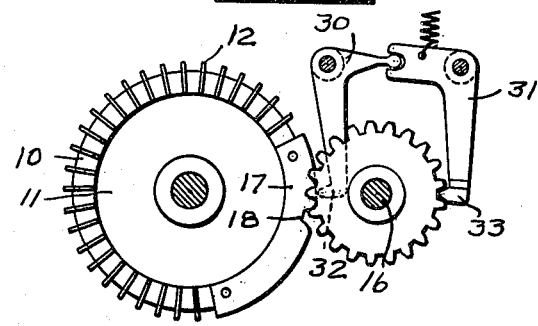

In Figure 1 the positive detent of this invention is shown as applied to the ciphering machine of Hagelin Patent No. 2,089,603 issued August 10, 1937, the view shown in Figure 1 corresponding to Figure 5 of the above mentioned patent. There is shown at 10 in Figure 1 a drum which is supported on two discs one of which is indicated at 11. The drum 10 is slotted and carries in the slots the bars 12 which act as gear teeth and which will be referred to hereinafter as teeth. The sliding teeth 12 may be displaced axially of the drum 10 by means not here disclosed but which are fully disclosed in the above mentioned patent. The teeth 12 in one of their two positions mesh with the teeth of idler gear 13 which gear is supported on shaft 14 and which gear in turn drives the secondary or driven gear 15 mounted on the shaft 16. As shown in Figure 1, these parts are in their normal position and in this position a cam 17 mounted on the drum 10 occupies that portion of the periphery of the drum not utilized by sliding teeth 12. This cam is notched or cut back at 18 in order that the driven gear 15 may be reset, as for example by hand or by any known type of reset mechanism. The detent mechanism of my invention comprises the arm 20 pivoted on the shaft 21 and having a flattened face 22 which cooperates with the cam member 17 and with inactive ones of the teeth 12. This arm or detent 20 terminates in a pawl or finger 23 which bears against the teeth of the driven gear 15. By reference to Figure 3, it will be seen that when the teeth 12 are in their upper position, as shown in that figure, the projection 12A thereof cooperates with the camming portion 22 of detent or arm 20 causing finger 23 to be forced between the teeth of gear 15 to lock that gear in position, the projection 12B of the tooth 12 being ineffective at this time. Reference to Figure 4 shows that when the tooth 12 is in its lower position the projection 12A is ineffective whereas the projection 12B meshes with the idler gear 13 and causes this gear together with gear 15 to be rotated. As will be clear by referring to either Figures 1 or 2, the detent 20 is held to the right by spring 24 so that there is always a detent action even when the gears 13 and 15 are being driven by active teeth 12 on the drum 10. It will be clear, however, that when these gears are being thus driven the teeth of gear 15 cause the detent 20 to be moved clockwise permitting the rotation of the gear. It will likewise be clear that when a tooth 12 is in the inactive position, it will prevent movement of the pawl 20 in a clockwise direction and will thus cause finger 23 to remain between the teeth of gear 15 and to prevent any overthrow or any rotation of gear 15 resulting from any other cause.

Thus when the driving member 10 is rotated, the gear 15 will first be locked by virtue of the surface of the cam 17 coming into contact with the cam face 22 on the detent or arm 20. If all the teeth 12 should be in their inactive position, as shown in Figure 3, the projections 12A would act in the same manner as the cam 17 and the gear 15 would be locked against rotation during the entire revolution of member 10. However, whenever a tooth 12 is in its active position the projection 12A will be in the position shown in Figure 4 and will not contact the face 22 of detent 20 and, therefore, the gear 15 will be free to rotate through a tooth space under drive of a projection 12B of the active tooth. Any following tooth 12 which is in inactive position will immediately lock the gear 15 again and will thus prevent overtravelling. The arm 17 likewise serves to prevent overtravelling at such times as the tooth 12 immediately preceding this cam is in active position.

Referring now to Figures 5 through 8, there is shown the same drum 10 having teeth 12 and cam 17. In this instance, however, the idler gear 13 is omitted and the detent acts directly upon the driven gear 15. In this instance also the detent mechanism comprises two bell cranks 30 and 31, the bell crank 30 terminating in a nose 32 which cooperates with the teeth 12 and with the cam 17. The bell crank 31 terminates in a projection 33 which is in the plane of the teeth of gear 15 and which performs the detenting function. The bell cranks 30 and 31 cooperate with each other by virtue of bell crank 31 terminating in a bifurcated extension into which a ball formed on the end of bell crank 30 fits. A light spring 34 holds the detenting projection 33 against the gear 15. Thus, whenever a tooth 12 is in inactive position, it prevents clockwise rotation of the bell crank 30 and counterclockwise rotation of bell crank 31, whereby the detenting member 33 is held in position to prevent rotation of gear 15. The condition just mentioned is shown particularly in Figure 6 where the terminating portion 32 of bell crank 30 is shown against the surface of cam 17 thereby forcing the detenting member 33 into a tooth space of the gear 15 and preventing its rotation.

Figure 7:
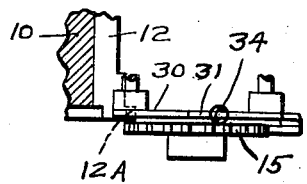
Figure 8:
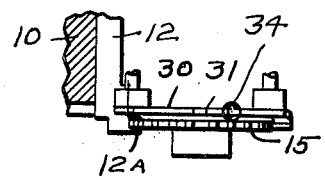

In connection with this modified form of the invention, attention is called to Figures 7 and 8 wherein the sliding bars or teeth 12 are shown as having a single projection 12A rather than the two projections 12A and 12B of Figures 1 through 4. It will be seen that with this construction the single projection 12A is either in active position, as shown in Figure 8, to drive the gear or is in inactive position in which it serves as a carrying member to cooperate with the terminating portion 32 of bell crank 30 as shown in Figure 7.

While I have described the detent of my invention particularly as applied to the mechanism of Hagelin Patent No. 2,089,603 and have mentioned the use of the mechanism of that patent for displacing the teeth to render them active, it is to be understood that any other suitable displacing mechanism may be utilized. It is further to be understood that the form of tooth shown in connection with Figures 5 through 8 is merely an alternative for that shown in Figures 1 through 4 and that either form of tooth may be utilized with either form of detent mechanism disclosed.

Thus, I have described merely preferred embodiments of my invention and it is clear that no limitations are to be implied therefrom but that the only limitations are to be those of the appended claims.

What is claimed is:

1. In a detent mechanism for use with gearing comprising a driven gear and a driving gear having a variable number of active teeth, in combination, a detent mechanism having a finger cooperating with the driven gear and means cooperating with inactive teeth of the driving gear to hold said detent finger in position to lock said driven gear against movement.

2. In a detent mechanism for use with gearing comprising a driven gear and a driving gear having a variable number of active teeth, in combination, a detent mechanism having a finger cooperating with the driven gear and a cam surface on said detent cooperating with inactive teeth of the driving gear to hold said detent finger in position to lock said driven gear against movement.

3. In a detent mechanism for use with gearing comprising a driven gear and a driving gear having a variable number of active teeth, in combination, a detent mechanism having a finger cooperating with the driven gear, means cooperating with inactive teeth of the driving gear to hold said detent finger in position to lock said driven gear against movement and a cam mounted on the driving gear and occupying the portion of the periphery thereof not occupied by teeth, said cam lying in the plane of inactive teeth to thereby prevent movement of the driven gear during portions of the rotation in which no teeth of the driving gear are engaged with the driven gear.

4. In a detent mechanism for use with gearing comprising a driven gear and a driving gear having a variable number of active teeth, in combination, a detent mechanism having a finger cooperating with the driven gear, means cooperating with inactive teeth of the driving gear to hold said detent finger in position to lock said driven gear against movement, a cam mounted on the driving gear and occupying the portion of the periphery thereof not occupied by teeth, said cam lying in the plane of inactive teeth to thereby prevent movement of the driven gear during portions of the rotation in which no teeth of the driving gear are engaged with the driven gear, and a notch in said cam aligned with the detent cam surface when the gears are in normal position, said notch permitting the release of the detent to permit setting of the driven gear to a desired initial position.

5. In a detent mechanism for use with gearing comprising a driven gear and a driving gear having a variable number of active teeth, in combination, a detent mechanism comprising a bell crank having a finger cooperating with the driven gear, a second bell crank having a cam surface cooperating with inactive teeth of the driving gear and means to interconnect said bell cranks to hold said detent finger in position to lock said driven gear against movement whenever the camming surface of said second bell crank is in contact with inactive teeth of the driving gear.

BORIS CEASAR WILHELM HAGELIN.